United States Patent
van Riel

(10) Patent No.: US 8,010,747 B2
(45) Date of Patent: Aug. 30, 2011

(54) METHOD FOR TRACKING OF NON-RESIDENT PAGES

(75) Inventor: Henri Han van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 12/824,692

(22) Filed: Jun. 28, 2010

(65) Prior Publication Data

US 2010/0268900 A1 Oct. 21, 2010

Related U.S. Application Data

(60) Continuation of application No. 12/111,546, filed on Apr. 29, 2008, now Pat. No. 7,747,824, which is a division of application No. 11/289,405, filed on Nov. 30, 2005, now Pat. No. 7,386,673.

(51) Int. Cl.
*G06F 12/00* (2006.01)
*G06F 13/00* (2006.01)
*G06F 13/28* (2006.01)

(52) U.S. Cl. ........................................ 711/133; 711/159

(58) Field of Classification Search .................. 711/133, 711/159

See application file for complete search history.

(56) References Cited

U.S. PATENT DOCUMENTS

| | | | |
|---|---|---|---|
| 6,167,490 A | 12/2000 | Levy et al. | |
| 6,308,247 B1 | 10/2001 | Ackerman et al. | |
| 6,425,057 B1 | 7/2002 | Cherkasova | |
| 6,996,676 B2 | 2/2006 | Megiddo et al. | |
| 7,096,323 B1 | 8/2006 | Conway | |
| 7,386,673 B2 | 6/2008 | van Riel | |
| 7,487,320 B2 | 2/2009 | Bansal | |
| 7,747,824 B2 | 6/2010 | van Riel | |
| 2003/0074525 A1 | 4/2003 | Yamauchi | |
| 2004/0078631 A1 | 4/2004 | Rogers et al. | |
| 2004/0098541 A1 | 5/2004 | Megiddo | |
| 2004/0172503 A1* | 9/2004 | Merchant | 711/114 |
| 2005/0015562 A1 | 1/2005 | Goodsell | |
| 2005/0086437 A1 | 4/2005 | Modha | |
| 2005/0097278 A1* | 5/2005 | Hsu et al. | 711/129 |
| 2005/0165758 A1 | 7/2005 | Kasten et al. | |
| 2006/0069876 A1* | 3/2006 | Bansal et al. | 711/134 |
| 2006/0090042 A1* | 4/2006 | Nakatani et al. | 711/147 |

OTHER PUBLICATIONS

Megiddo, Nimrod; ARD: A Self-Tuning, Low Overhead Replacement Cache; Mar. 31, 2003; USENIX File & Storage Technologies Conference.
Notification of Transmittl of the International Search Report, International Searching Authority, International Application No. PCT/US 06/61338. Mar. 14, 2008, 2 pages.

* cited by examiner

*Primary Examiner* — Kevin L Ellis
*Assistant Examiner* — Ryan Bertram
(74) *Attorney, Agent, or Firm* — MH2 Technology Law Group LLP

(57) ABSTRACT

Embodiments of the present invention provide methods and systems for efficiently tracking evicted or non-resident pages. For each non-resident page, a first hash value is generated from the page's metadata, such as the page's mapping and offset parameters. This first hash value is then used as an index to point one of a plurality of circular buffers. Each circular buffer comprises an entry for a clock pointer and entries that uniquely represent non-resident pages. The clock pointer points to the next page that is suitable for replacement and moves through the circular buffer as pages are evicted. In some embodiments, the entries that uniquely represent non-resident pages are a hash value that is generated from the page's inode data.

6 Claims, 7 Drawing Sheets

METHOD FOR TRACKING OF NON-RESIDENT PAGES

CROSS-REFERENCE TO RELATED APPLICATION

This application is a continuation of application Ser. No. 12/111,546, filed Apr. 29, 2008, now U.S. Pat. No. 7,747,824 which is a divisional of application Ser. No. 11/289,405, filed Nov. 30, 2005 (now U.S. Pat. No. 7,386,673), all of which are incorporated herein by reference.

FIELD OF THE INVENTION

The present invention relates generally to computer memory management. More particularly, the present invention relates to tracking pages of memory that have been evicted from a resident memory to a non-resident memory.

BACKGROUND OF THE INVENTION

Memory management is one of the most fundamental issues of modern computer systems. Typically, a computer system will include a hierarchy of memory that ranges from a small, fast cache of main memory that is placed in front of a larger, but slower, auxiliary memory. The cache is generally implemented using a physical memory, such as RAM, while the auxiliary memory is implemented using a storage device, such as a disk drive or hard disk. Both memories are usually managed in uniformly sized units known as pages. Because of their impact on performance, caching algorithms that manage the contents of the main memory are of tremendous importance to virtually any type of computer system, server, storage system, and operating system.

In order to improve performance, many computers and operating systems today implement a virtual memory. Virtual memory is where the computer system emulates that it has more memory than the computer system actually physically possesses. For example, most computer systems utilize 32-bit processors. Hence, a computer system is theoretically capable of providing a virtual memory of approximately $2^{32}$ bits or approximately 4 Gigabytes, even though the physical memory is usually much smaller.

In order to provide a virtual memory of this size, the computer system runs the application or process in a memory address space that is virtual, i.e., not tied to the physical memory. The computer system will then swap pages in and out of a cache in its physical memory in order to emulate the virtual memory. During operation, an application or process will continually request pages using virtual memory addresses. In response, the computer system will translate the virtual memory address into a physical memory address and determine if the page is present in the cache (i.e., the page is resident). When a requested page is not present in the cache, it is called a cache "miss" (or page fault), and the requested page must be retrieved from storage.

However, when the cache is full, before a new page can be brought into the cache, another page (known as the victim page) must be evicted. The victim page is selected by what is known as a replacement algorithm. Several replacement algorithms are well known to those skilled in the art including Least Recently Used (LRU), 2Q, Adaptive Replace Cache (ARC), Clock with Adaptive Replacement (CAR/CART), Low Inter-reference Recency Set (LIRS), CLOCK, and CLOCK-PRO.

Unfortunately, the known cache replacement algorithms have difficulty with different types of workloads. In particular, the known cache replacement algorithms have difficulty balancing the different "recency" and "frequency" characteristics of various workloads. For example, one of the most popular algorithms is LRU. LRU replaces the page that was least recently accessed or used. LRU assumes that a page that was recently accessed will likely be accessed again, and thus, it works well with workloads having high recency characteristics. However, LRU does not perform well with workloads that exhibit certain frequency characteristics to their page access, such as scanning or looping. As a result, a computer system that uses LRU will often prematurely evict pages and be forced to retrieve the page again from storage.

Other algorithms, such as CLOCK and CLOCK-PRO, attempt to overcome the deficiencies of LRU by tracking pages that have been recently evicted. By tracking recently evicted pages, these algorithms attempt to recognize workloads that exhibit certain frequencies of page access. However, these algorithms also have several deficiencies.

For example, algorithms other than LRU tend to be difficult to tune or implement. In addition, algorithms that track recently evicted pages require a full page data structure in main memory. This results in a performance overhead that consumes a relatively large amount of space in main memory.

Accordingly, it would be desirable to provide cache replacement algorithms and systems that can maximize their hit rate or maintain a relatively low miss rate. In addition, it would be desirable to provide cache replacement algorithms and systems that can handle a variety of different workloads with a minimal amount of overhead. Furthermore, it would be desirable to provide cache replacement algorithms and systems that are relatively simple to implement.

SUMMARY OF THE INVENTION

In accordance with one feature of the invention, a method of determining a status of an evicted page of data is provided. An index is determined from information identifying the evicted page that points to one of a set of buckets in a data structure. Each bucket comprises entries that represent pages that have been evicted from a cache. An identifier is determined for the evicted page and the one bucket is searched for an entry that matches the identifier for the evicted page. A status of the evicted page can then be determined based on the position of its entry in the one bucket.

In accordance with another feature of the invention, a method of determining a refault distance for an evicted page from when it was evicted from a resident cache is provided. An index is determined from information identifying the evicted page that points to one of a set of buckets in a data structure. Each bucket comprises entries that represent pages that have been evicted from the resident cache and a pointer that points to a current entry in the one bucket. An identifier is determined for the evicted page. The one bucket is searched for an entry that matches the identifier for the evicted page. A local distance of the entry is determined for the evicted page in the data structure relative to the current entry pointed by the pointer. A number of buckets in the data structure is determined. A refault distance is then determined for the evicted page from when it was evicted based on the local distance and the number of buckets in the data structure.

In accordance with another feature of the invention, a method of adding a refaulted page into a resident cache as one of a hot page or cold page is provided. A size of the resident cache and a refault distance of the refaulted page are determined A rate that pages are being evicted from the resident cache is measured. A number of hot pages currently in the resident cache is determined and a rate that hot pages are being scanned is measured. The refaulted page is then added as one of a hot page or cold page in the resident cache based on the size of the resident cache, the refault distance, the rate that pages are being evicted, the number of hot pages currently in the resident cache, and the rate that hot pages are being scanned.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for efficiently tracking evicted or non-resident pages. For each non-resident page, a first hash value is generated from the page's metadata, such as the object the page belongs to and the offset of that page's data within that data. This first hash value is then used as an index to point one of a plurality of circular buffers. Each circular buffer comprises an entry for a clock pointer and entries that uniquely represent non-resident pages. The clock pointer points to the next page that is suitable for replacement and moves through the circular buffer as pages are evicted. In some embodiments, the entries that uniquely represent non-resident pages are a hash value that is generated from the page's inode data. Each circular buffer may be relatively small in order to minimize its overhead.

Reference will now be made in detail to exemplary embodiments of the invention, which are illustrated in the accompanying drawings. Wherever possible, the same reference numbers will be used throughout the drawings to refer to the same or like parts.

Figure 1:
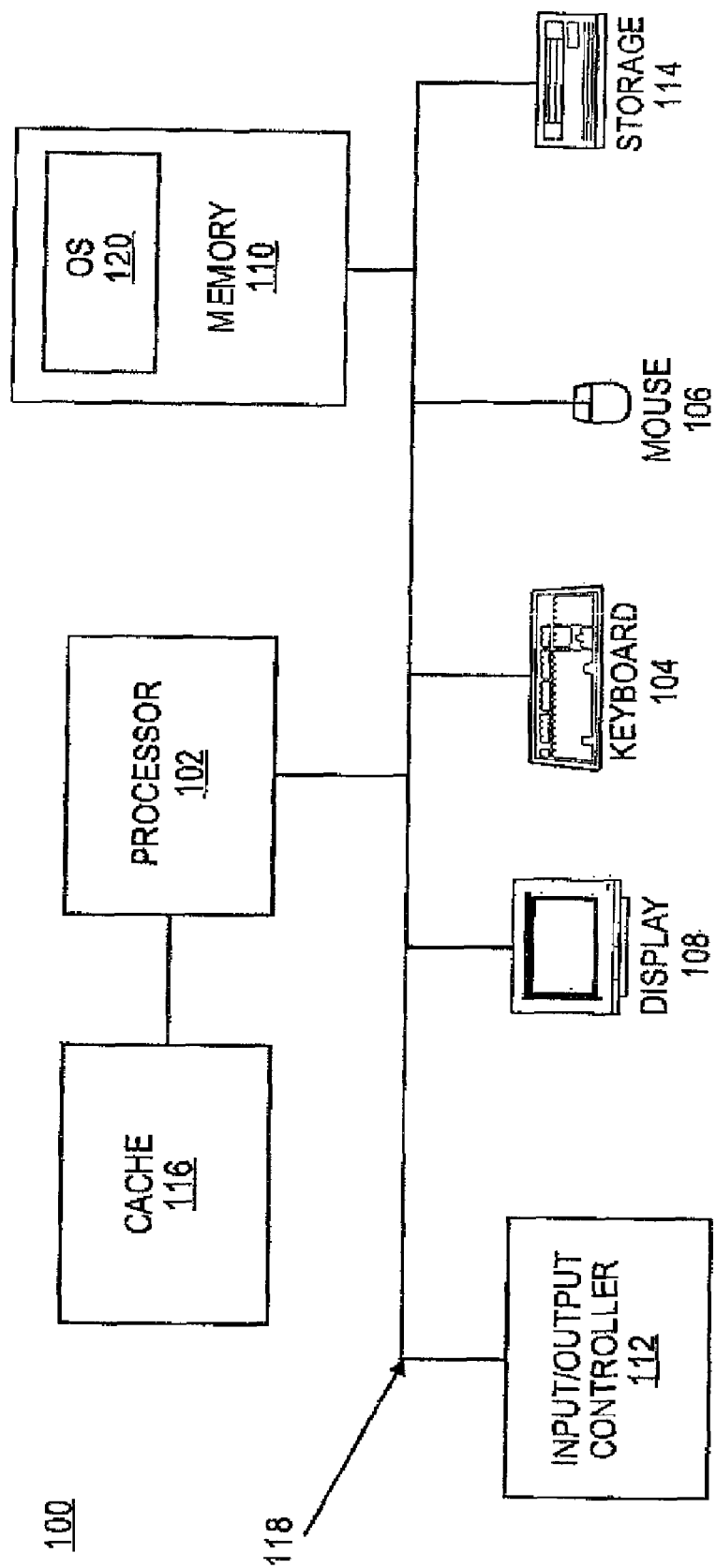
FIG. 1 illustrates an exemplary system that is in accordance with embodiments of the present invention.

FIG. 1 illustrates a computer system 100 that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

In addition, computer system 100 may include an operating system (OS) 120 that resides in memory 110 during operation. OS 120 is an integrated collection of routines and programs that service sequencing and processing of programs and applications running on computer system 100. OS 120 may provide many services for computer system 100, such as resource allocation, scheduling, input/output control, and memory management. OS 120 may be predominantly software, but may also comprise partial or complete hardware implementations and firmware. Well known examples of operating systems that are consistent with the principles of the present invention include Mac OS by Apple Computer, GNU/LINUX, Java and Sun Solaris by Sun Microsystems, Windows by Microsoft Corporation, Microsoft Windows CE, One skilled in the art will recognize that system 100 may comprise various other components, such as multiple processors, additional storage devices, etc. Such components are well known to those skilled in the art.

Figure 2:
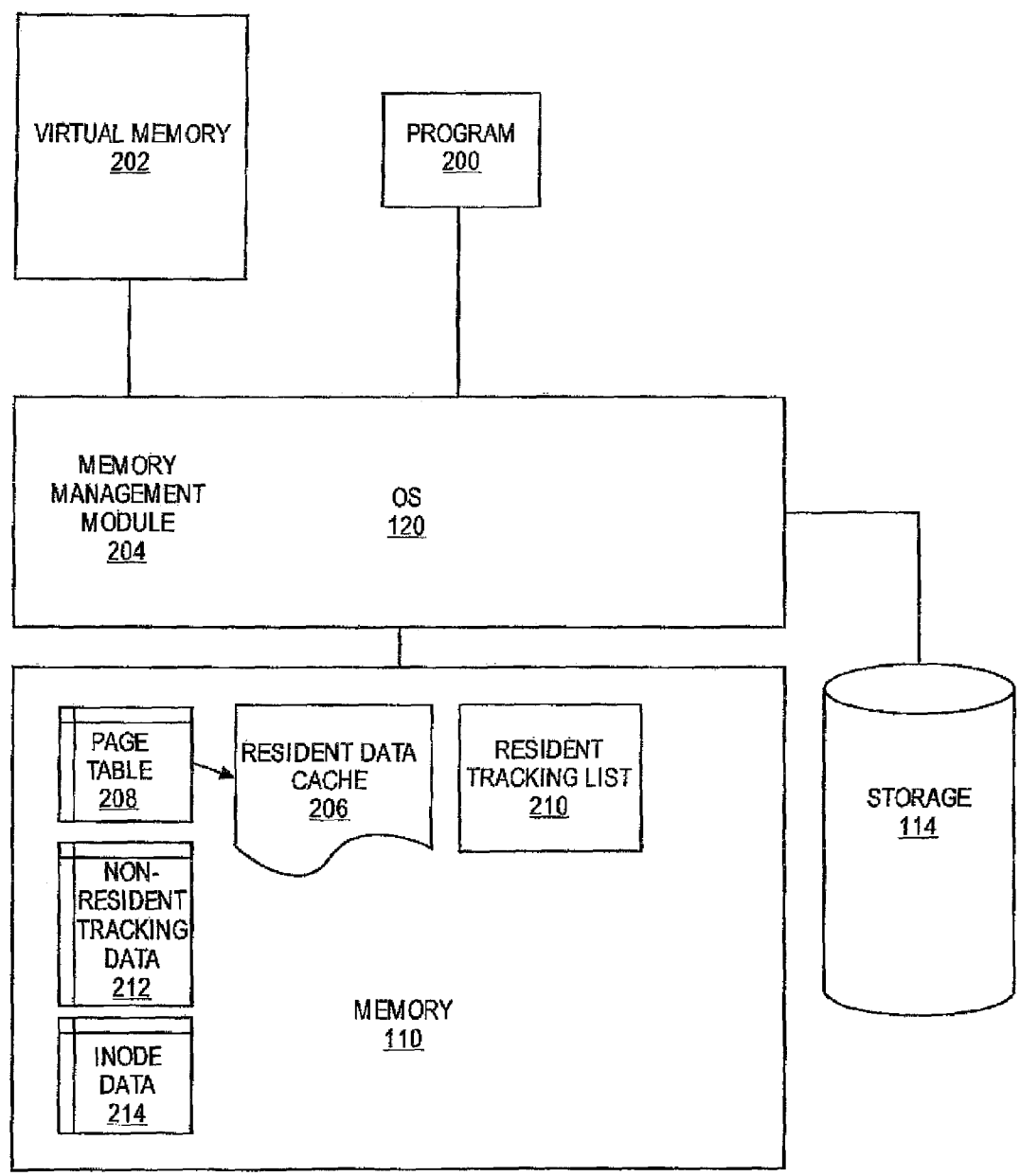
FIG. 2 illustrates an exemplary architecture of the system shown in FIG. 1.

FIG. 2 illustrates a general architecture of computer system 100 that is in accordance with embodiments of the present invention. As shown, computer system 100 is running a program 200 on OS 120. In addition, OS 120 is providing a virtual memory 202 to support the operation of program 200. OS 120 may utilize inode data 214, a page table 208, a resident data cache 206, and non-resident tracking data 212. OS 120 may also maintain a hot list (not shown) and a cold list (not shown) to track various types of pages in resident data cache 208. OS 120 may also be coupled to storage 114 and retrieve various pages that are not stored in memory 110.

Program 200 may be any application or other program that runs on top of OS 120. Such programs are well known to those skilled in the art.

Virtual memory 202 is the memory space in which program 200 operates. As noted above, virtual memory 202 utilizes an address space that is not tied to the physical address space of memory 110.

Memory management module 204 is a component of OS 120 that decides which parts of virtual memory 202 are kept in memory 110 in resident data cache 206. Resident data cache 206 is the portion of virtual memory 202 that is currently resident in memory 110. Memory management module 204 may operate in conjunction with other components of computer system 100 that are not shown in FIG. 2. For example, memory management module 204 may operate with a memory management unit associated with processor 102 and maintain several data structures for managing the data that is held in resident data cache 206 and tracking relevant information for program 200 from storage 114. Some of these data structures will now be briefly described.

Page table 208 provides a mapping between the virtual address space of virtual memory 202 and the physical address space of memory 110. In some embodiments, page table 208 may be used in conjunction with a translation lookaside buffer (TLB) (not shown), which are well known to those skilled in art. Typically, page table 208 is accessed by extracting the virtual page frame number and offset of the desired data. The virtual page frame number serves as an index to page table 208 to retrieve a physical page frame number. The physical address may then be determined by multiplying the page size by the physical page frame number and adding the offset (if needed). The use and structure of page table 208 is well known to those skilled in the art.

In some embodiments, OS 120 may be configured to use demand paging. In general, demand paging is where pages are loaded into memory on an as-needed basis. For example, in the embodiments illustrated in FIG. 2, pages that are currently in use by program 200 are loaded into memory 110 in resident data cache 206. However, due to this caching, some pages that are no longer needed may still be held in memory 110. Accordingly, memory management module 204 or processor may use resident tracking list 210 to help identify pages that are no longer needed.

Resident tracking list 210 is a list that tracks pages accessed for program 200, which current reside in resident data cache 206. Each page on resident tracking list 210 is marked as either hot or cold. A page is categorized as hot or cold based on their reuse distance. A reuse distance is the number of pages that were accessed in between any two consecutive references to a particular page. Pages with a small reuse distance are considered hot, while pages with a larger reuse distance are considered cold.

Resident tracking list 210 is sized according to the size of resident data cache 206. The pages in resident tracking list 210 are sorted in the order of their accesses. Pages having small recencies (i.e., pages that were accessed a relatively short time ago) are placed at the head of the list and the pages with large recencies are placed at the tail. When free space must be generated, memory management module 204 will evict a cold page at the tail of resident tracking list 210.

When a page is evicted, its information is passed into non-resident tracking data 212. Non-resident tracking data 212 provides an efficient data structure for tracking pages as they are evicted from resident data cache 206. In particular, non-resident tracking data 212 is structured to also indicate the reuse distance of a page even after it has been evicted. This information is not currently available using known algorithms, since they maintain a simple buffer of recently evicted pages in memory 110. The structure of non-resident tracking data 212 is further described with reference to FIG. 3. In some embodiments, non-resident tracking data 212 utilizes inode information that is retrieved from inode data 214.

Inode data 214 is a data structure of OS 120's file system. For example, inode data 214 may be a cache of active and recently used inodes. In particular, in some embodiments, each file used by the file system of OS 120 is identified by what is known as an inode data structure. In general, the inode data structure provides a several attributes about a file and its objects including: the length of the file; an identification of the device containing the file; an inode number that identifies the file within the file system; a mapping that points to a linked list; an offset of an object within a page; and a reference count indicating how many links currently point to the file.

When program 200 refers to a file name that file name is used to look up the file's inode. The inode is then used to derive an index into page table 208 to retrieve the pages of data that correspond to the desired file and its objects. In some embodiments, the inode information from inode data 214 is also used to derive an index into non-resident tracking data 212. Page table 208 may thus be used by the virtual memory of system 100 to locate data in inodes. Of course, one skilled in the art will recognize that OS 120 may use other mechanisms and data structures to look up data in inodes.

Figure 3:
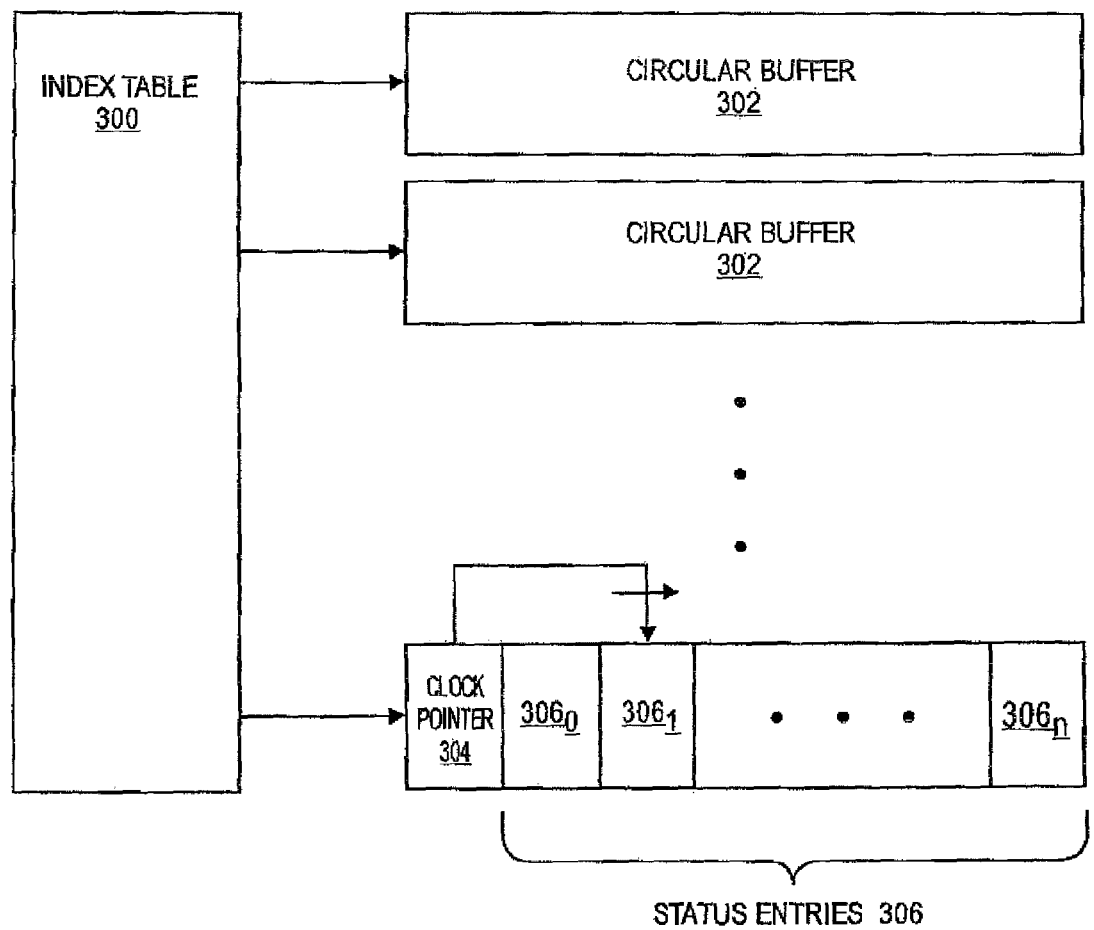
FIG. 3 illustrates an exemplary data structure that tracks non-resident data in accordance with embodiments of the present invention.

FIG. 3 shows an exemplary data structure for non-resident tracking data 212 that is consistent with embodiments of the present invention. As shown, non-resident tracking data 212 may comprise an index table 300 and a set of circular buffers 302. Although circular buffers 302 are shown as separate entities, one skilled in the art will recognize that circular buffers 302 may be implemented as an array data structure in memory 110. In addition, in some embodiments, non-resident tracking data 212 is sized to track at least as many evicted pages as there are pages in memory 110. Of course, non-resident tracking data 212 may be sized according to other criteria.

Index table 300 is a hash table that is based on the mapping information, such as an i_mmap pointer, and an offset of an object within an evicted page. In some embodiments, the mapping and offset are hashed and a subset of the most significant bits from the resulting value is used to determine the index into circular buffers 302. In other embodiments, the mapping and offset are hashed and a subset of the most significant bits from the resulting value is used to determine the index into circular buffers 302 without the use of index table 300.

Circular buffer 302 comprises a clock pointer 304 and a set of status entries $306_{0-n}$. In some embodiments, circular buffers 302 may be sized according to minimize the number of operations required by processor 102. For example, circular buffers 302 may comprise 32 entries of 32 bit words for each evicted page.

Clock pointer 304 is a pointer to the current least recently accessed or oldest page referenced in that circular buffer 302. As pages are evicted from resident data cache 206, the oldest entry pointed by clock pointer 304 is overwritten. Clock pointer 304 is then advanced to the next oldest entry in that circular buffer 302.

Status entries $306_{0-n}$ are entries that represent pages that have been evicted from resident data cache 206. In some embodiments, status entries $306_{0-n}$ are derived by hashing the mapping and offset of the evicted page with the inode number to which that page belongs. This results in a unique identifier for the evicted page for use in status entries $306_{0-n}$.

Of note, when desired, memory management module 204 may easily determine the status of a non-resident page that has been evicted by searching through non-resident tracking data 212.

Figure 4:
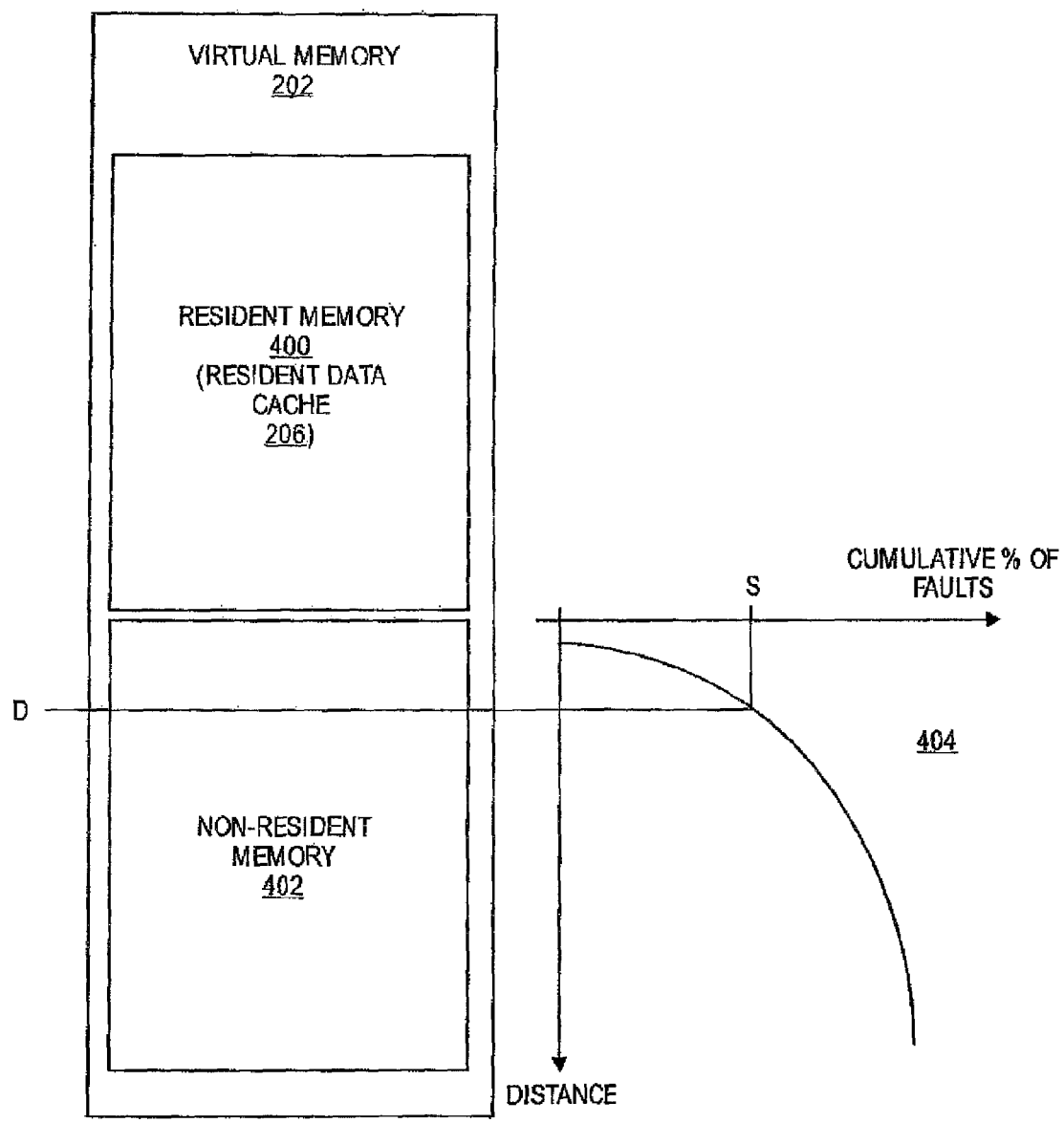
FIG. 4 conceptually illustrates the tuning of a cache based on tracking non-resident data in accordance with embodiments of the present invention.

FIG. 4 conceptually illustrates the tuning of resident data cache 206 based on tracking non-resident data 214 in accordance with embodiments of the present invention. FIG. 4 is provided to conceptually illustrate the usefulness of tracking non-resident data for tuning the size of a cache based on the status of the non-resident data.

As shown, virtual memory 202 may conceptually be viewed as having a resident memory portion 400 corresponding to resident data cache 206 and a non-resident memory 402. Non-resident memory 402 may comprise pages that have been evicted from resident memory portion 400.

Since resident data cache 206 is smaller than virtual memory 202, at some point, a page will be faulted into resident memory portion 400. In some embodiments, when this occurs, non resident memory portion 402 can be searched using non-resident tracking data 214 to determine if that page has been previously evicted. In addition, non-resident tracking data 214 may indicate a distance by seeing how far the page's entry in circular buffer 302 is from the current value of clock pointer 304 and scaling it by the size of the array used to non-resident tracking data 214. This distance roughly indicates the number of pages which have been evicted since the page of interest was evicted.

However, this distance may also be viewed as the number of pages that must be added to the cache to avoid the page fault in resident memory portion 400, i.e., a cache shortage. To illustrate this point, a graph 404 is provided alongside non-resident memory portion 402. As shown in graph 404, as the distance increases, the number of cumulative faults prevented increases. Therefore, for example, if resident memory portion 400 were increased to a depth "D", then a cummulative percentage of faults "S" would be prevented.

Figure 5:
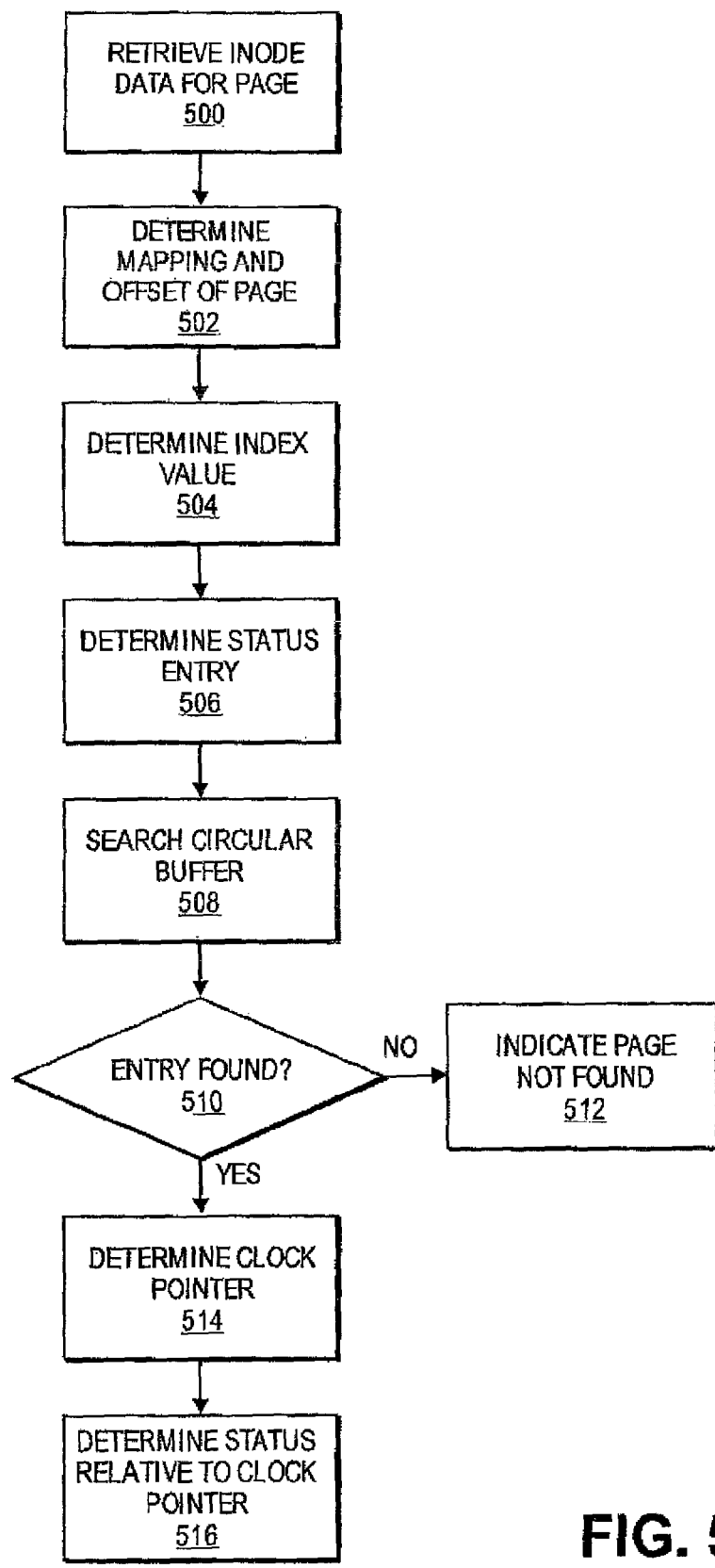
FIG. 5 illustrates an exemplary process flow for tracking non-resident data in accordance with embodiments of the present invention.

Now that some of the basis for tracking non-resident data has been explained, FIGS. 5-7 will now be described to illustrate the process flows for tracking non-resident data and for tuning the size of a cache. In particular, FIG. 5 illustrates an exemplary process flow for tracking non-resident data that is in accordance with embodiments of the present invention.

In stage 500, when a page request to resident data cache 206 has faulted, memory management module 204 may determine whether the requested page was recently or previously evicted. Accordingly, memory management module 204 may access inode data 214 for the requested page. Processing may then flow to stage 502.

In stage 502, memory management module 204 may determine the mapping and offset for the requested page. For example, memory management module 204 may make a call in OS 120 to a function "int recently_evicted (struct address_space *mapping, unsigned long index)." That is, this function uses the mapping and offset of the requested page as its input parameters and provides a result used in stage 504. Processing may then flow to stage 504.

In stage 504, memory management module 204 determines an index value for beginning its search in non-resident tracking data 212. In some embodiments, memory management module 204 may determine the index by hashing the page's mapping and offset parameters retrieved in stage 502 and selecting the most significant bits of this hash value. Processing may then flow to stage 506.

In stage 506, the index points to one of circular buffers 302 and memory management module 204 determines a unique entry that represents the requested page. For example, in some embodiments, memory management module 204 hashes the page's mapping and offset parameters with the inode number of the file or object to which the page belongs. Processing may then flow to stage 508.

In stage 508, memory management module 204 may search the circular buffer 302 based on the hash value determined in stage 506. For example, memory management module 204 may search entries $306_{0-n}$ to determine if any have a matching value. Processing then flows to stage 510.

In stage 510, memory management module 204 determines whether a matching entry has been found. If a matching entry is not found, then processing may flow to stage 512. In stage 512, memory management module 204 determines that the requested page was not recently evicted, i.e., the requested page is a new page. In addition, memory management module 204 may proceed with retrieving the requested page from storage 114.

If the page was found in non-resident tracking data 212, then processing may flow to stage 514. Since the entry was found, this indicates that the requested page was recently evicted. Accordingly, in stage 514, memory management module 204 may proceed with determining the status of this recently evicted page. In particular, memory management module 204 may determine which of entries $306_{0-n}$ is pointed by clock pointer 304. Processing may then flow to stage 516.

In stage 516, memory management module 204 may then compare the position of the evicted page's entry in circular buffer 302 with clock pointer 304. This relative position indicates the evicted page's reuse distance. This reuse distance may be easily calculated by memory management module by multiplying the relative distance of the evicted page's entry from clock pointer 304 with the size of the array used for non-resident tracking data.

Memory management module 204 may then determine the status of the evicted page by comparing its reuse distance with the distance to the coldest page in resident data cache 206. For example, if the reuse distance of the evicted page is shorter, then this indicates that should be considered hotter than the coldest page in resident data cache 206. That is, the evicted page is more active than the oldest page in resident data cache 206 and should be loaded back into resident data cache 206. Conversely, if the reuse distance of the evicted page is longer than the newly faulted page, then this indicates that evicted page is colder than the coldest in resident data cache 206 and was appropriately evicted. Based on this status information of non-resident data, memory management module 204 may tune the size of resident data cache 206.

Figure 6:
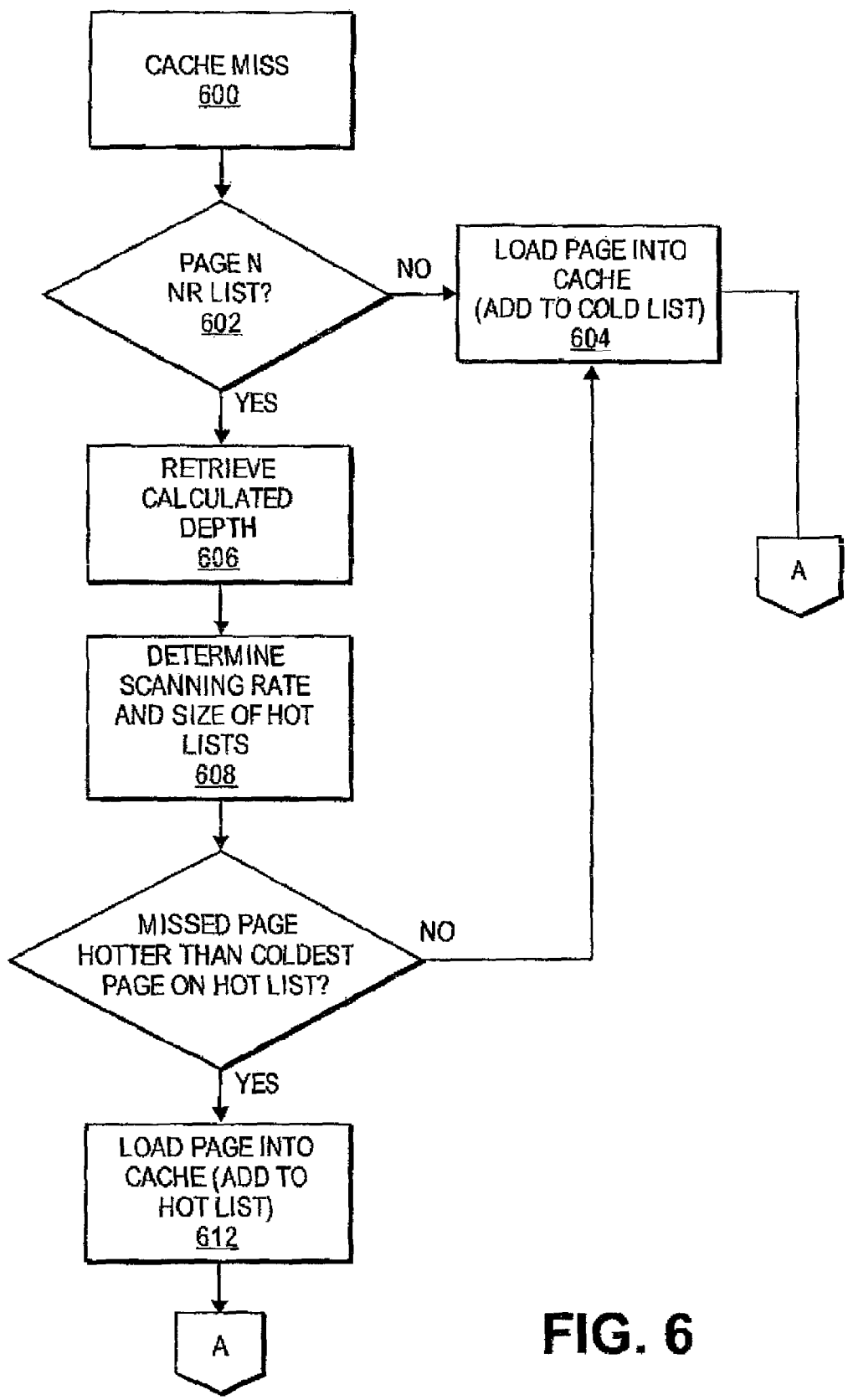
FIGS. 6 and 7 together illustrate an exemplary process flow for tuning a cache that is in accordance with embodiments of the present invention.
Figure 7:
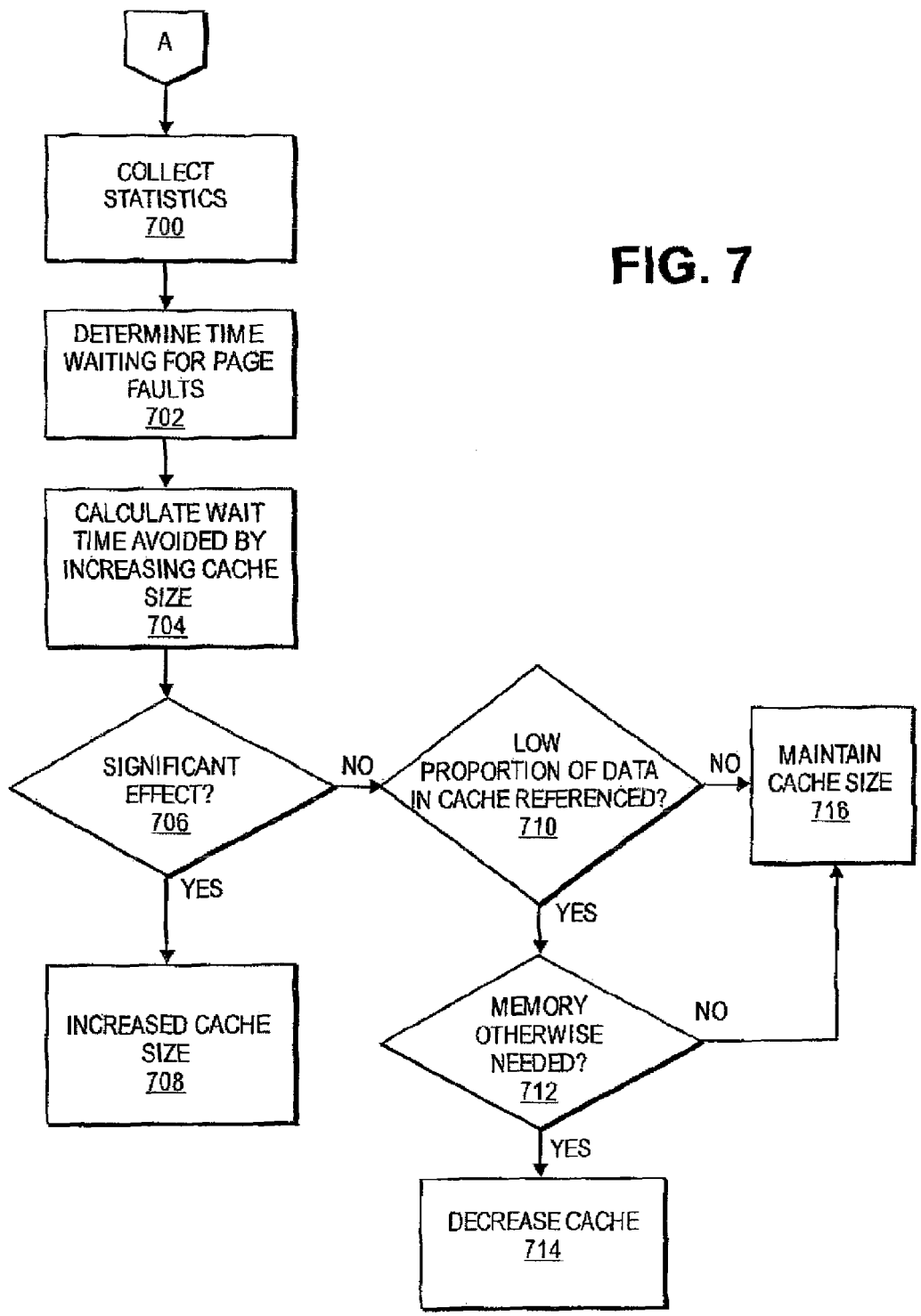

Accordingly, FIGS. 6 and 7 are provided to illustrate an exemplary process flow for tuning a cache in accordance with embodiments of the present invention. Beginning with FIG. 6, in stage 600, memory management module 204 receives cache miss for a page requested from resident data cache 206. As noted above, memory management module 204 may initially search for a requested page in resident data cache 206 using page table 208 and/or a TLB. However, if the page is not found, then memory management module 204 may receive a cache miss indication. Processing may then flow to stage 602. One skilled in the art will also recognize that if requested page is found in resident data cache 206 then this page is simply retrieved from memory 110.

In stage 602, the cache miss triggers memory management module 204 to determine whether the faulted page was recently evicted. Accordingly, memory management module 204 may search non-resident tracking data 212 as described above with reference to FIG. 5. If the page is not found, then processing may flow to stage 604. In stage 604, the page was not recently evicted, and thus, memory management module 204 must proceed with loading the page into resident data cache 206 from storage 114. Processing may proceed to stage 700, which is described below with reference to FIG. 7.

If the page is found, then this indicates the page was recently evicted. Accordingly, in stage 606, memory management module 204 may determine the number of pages that were evicted after the subject page was evicted, i.e., the page's depth or refault distance. For example, memory management module 204 may calculate the page's depth as described above with reference to FIG. 5. Processing may then flow to stag 608.

In stage 608, memory management module 204 may determine the scanning rate of resident data cache 206 and the number of hot pages currently in resident data cache 206. For example, memory management module 204 may access resident tracking list 210 to determine the number of hot pages. In addition, memory management module 204 may calculate the scanning rate based on information provided from processor 102.

In stage 610, memory management module 204 determines whether the subject evicted page is hotter than the coldest page in resident tracking list 210. As noted above with reference to FIG. 5, memory management module 204 may perform this determination by comparing the reuse distance of the subject evicted page with the reuse distance of a newly faulted page. If the subject evicted page is not hotter (i.e., colder) than the coldest page in resident tracking list 210, then this indicates that the corresponding page sets have been appropriately stored in resident data cache 206. Processing may then flow to stage 604.

However, if the subject evicted page is hotter than the coldest page in resident tracking list 210, then this indicates that the corresponding page sets in resident data cache 206 are less active than the subject evicted page. Processing may then flow to stage 612 where memory management module 204 loads the subject evicted page into resident data cache 206 and updates resident tracking list 210. Processing may then flow to stage 700, which is described with reference to FIG. 7. Alternatively, processing may end or resume again when a cache miss is encountered by memory management module 204.

Referring now to FIG. 7, in stage 700, memory management module 204 collects statistics about the performance of resident data cache 206. For example, as noted above, memory management module 204 may keep track of the calculated depth of a subject evicted page, the scanning rate of resident data cache 206, the number of hot pages in resident tracking list 210, and the like. Processing may then flow to stage 702.

In stage 702, memory management module 204 determines a cost for the current number of page faults. For example, memory management module 204 may determine the amount of time waiting (i.e., from disk access time) resulting from a page fault. Memory management module 204 may determine this information based on information provided from processor 102. Processing may then flow to stage 704.

In stage 704, memory management module 204 may calculate the effect of increasing the size of resident data cache 206. For example, as shown in FIG. 4, memory management module 204 may determine the amount of wait time avoided by increasing the size of resident data cache 206. Alternatively, memory management module 204 may maintain a histogram of bucket counts that indicate the number of page faults at various reuse distances into non-resident memory portion 402. Processing may then flow to stage 706.

In stage 706, memory management module 204 may determine if increasing resident data cache 206 has a significant impact. For example, memory management module 204 may use one or more predetermined thresholds for determining when the effect is considered significant. If the effect is considered significant then processing may flow to stage 708. In stage 708, memory management module 204 allocates more size for resident data cache 206. In some embodiments, memory management module 204 may allocate more size to resident data cache 206 in fixed increments.

However, if the effect is not significant, then processing may flow to stage 710. In stage 710, memory management module 204 may determine whether a low proportion of data in resident data cache 206 is currently referenced. Memory management module 204 may determine whether a page is currently referenced by checking the page reference bit for each page in resident data cache 206. Generally, when a page is currently referenced, its page reference bit is set to a binary value "1". Likewise, when a page is not currently being referenced, its page reference bit is set to a binary value of "0". Thus, memory management module 204 may scan through the page reference bits of the pages in resident data cache 206 and determine the proportion of pages that are currently referenced.

If the proportion of referenced pages is low, then processing may flow to stage 712. In stage 712, memory management module 204 may check whether space in memory 110 is needed by another program or process. For example, memory management module 204 may check whether other caches for access control lists, disk quota, directory entries, inodes, and the like require more memory. If memory is needed, then processing may flow to stage 714 where memory management module 204 reduces the size of resident data cache 206. If memory is not needed, then, in stage 716, memory management module 204 may decide to maintain the current size resident data cache 206.

Conversely, if the proportion of referenced pages is not low, then processing may again flow to stage 716. As noted, in stage 716, memory management module 204 determines that resident data cache should be maintained at its current size.

Other embodiments of the invention will be apparent to those skilled in the art from consideration of the specification and practice of the invention disclosed herein. For example, one skilled in the art will recognize the embodiments of the present invention may be used to tune multiple caches relative to each other. As noted, OS 120 may maintain a wide variety of caches for attributes, such as directory entries, disk quota, and the like, in addition to resident data cache 206. These caches may be tuned such that the ratio of objects in each cache to their respective scanning rates is approximately equal.

Alternatively, embodiments of the present invention may be implemented in a computer system that supports multiple virtual machines. Each virtual machine may have its own set of caches and non-resident tracking data. A virtual machine monitor or hypervisor may then be configured to track the non-resident data in similar manner described above. Based on the status of the non-resident data and reuse rates, the virtual machine monitor or hypervisor could then allocate more or less memory to each virtual machine based on its needs.

As another example, embodiments of the invention may be used computer systems that support database transactions. In particular, one skilled in the art will recognize that embodiments of the present invention may be used to tune caches used for caching query results or query optimization. One skilled in the art will recognize the embodiments of the present invention may be used in other ways.

What is claimed is:

1. A method of tracking non-resident pages, comprising:
maintaining a data structure identifying a set of pages in virtual memory that have been evicted from physical memory, wherein the data structure comprises a circular buffer for storing identifications of the set of pages and a pointer to an oldest page in the set of pages;
identifying a new page in the virtual memory that has been evicted from the physical memory;
removing, from the data structure, an identification of the oldest page in the set of pages referenced by the pointer; and
storing, in the data structure at a location of the removed identification of the oldest page, an identification of the new page in virtual memory that has been evicted from the physical memory.

2. The method of claim 1, wherein the data structure comprises an index table and a set of circular buffers.

3. The method of claim 2, wherein the index table comprises a hash table of information associated with the set of pages in virtual memory that have been evicted from the physical memory.

4. The method of claim 3, wherein the information associated with the set of pages comprises mapping information and an offset of an object within the set of pages.

5. The method of claim 1, wherein the identification of the new page in virtual memory comprises a unique identifier of the new page.

6. The method of claim 5, wherein the unique identifier comprises hash of mapping information of the new page, an offset of an object within the new page, and an inode number of the new page.

* * * * *